United States Patent [19]

Hayakawa

[11] Patent Number: 4,896,167

[45] Date of Patent: Jan. 23, 1990

[54] IMAGE RECORDING APPARATUS

[75] Inventor: Naoji Hayakawa, Yokohama, Japan

[73] Assignee: Canon Kabushiki Kaisha, Tokyo, Japan

[21] Appl. No.: 174,898

[22] Filed: Mar. 29, 1988

[30] Foreign Application Priority Data

Mar. 30, 1987 [JP] Japan .................................. 62-77096

[51] Int. Cl.[4] .............................................. G01D 15/10

[52] U.S. Cl. ................................ 346/76 PH; 400/120; 400/902

[58] Field of Search ................... 346/76 PH; 400/120, 400/719, 902, 903

[56] References Cited

U.S. PATENT DOCUMENTS 4,030,588 6/1977 Hanagata et al. ................... 400/902

FOREIGN PATENT DOCUMENTS 56-63476 5/1981 Japan .

0242086 12/1985 Japan .................................. 400/902

*Primary Examiner*—B. A. Reynolds

*Assistant Examiner*—Huan Tran

*Attorney, Agent, or Firm*—Fitzpatrick, Cella, Harper & Scinto

[57] ABSTRACT

An image recording apparatus for effecting image recording on a recording medium has drive transmitting members for imparting a drive force to a displaceable member, a motor for imparting a drive force to the drive transmitting members, COMMAND UNIT for designating the drive torque of the drive means, and control unit for controlling electric power applied to the drive means in conformity with the drive torque designated by the COMMAND UNIT.

11 Claims, 4 Drawing Sheets

IMAGE RECORDING APPARATUS

BACKGROUND OF THE INVENTION

1. Field of the Invention

This invention relates to an image recording apparatus for effecting recording of images on a recording medium.

The recording medium covers, for example, thermosensitive paper, plain paper, a plastic sheet and the like. Also, the image recording apparatus covers, for example, a facsimile apparatus, a copying apparatus, a printer, etc. The images are, for example, numerals, characters, figures or patterns, and include transmitted images, images read from originals, output images of a computer, etc.

2. Related Background Art

Thermosensitive recording is very simple in its process and is suitable for making the apparatus compact and low in cost, and has recently been widely used in OA instruments such as facsimile apparatus and the like. On the other hand, thermal transfer recording is being popularized in the field of plain paper recording or color recording. With such situation as the background, there is seen the advent of a recording apparatus which can accomplish both thermosensitive recording and thermal transfer recording by the use of the same recording mechanism because of the similarity of these two recording processes.

However, in the conventional recording apparatus both for thermosensitive recording and thermal transfer recording, the same drive system is used in the two types of processes, and this has led to the necessity of setting the torque of the drive system in accordance with the process in which the load is greater.

FIG. 1 of the accompanying drawings shows an example of the apparatus according to the prior art. In FIG. 1, the reference numeral 6 designates a thermal head and the reference numeral 7 denotes a platen roller. In the case of thermosensitive recording, the reference numeral 8 designates thermosensitive paper, and in the case of thermal transfer recording, the reference numeral 8 denotes plain paper and the reference numeral 9 designates an ink sheet. In this example, the load torque during thermal transfer recording becomes greater by an amount corresponding to the ink sheet 9. Accordingly, the torque of the drive system is set to a value necessary for thermal transfer recording. On the other hand, during thermosensitive recording, the load decreases by an amount corresponding to the absence of the ink sheet 9 and therefore, the torque of the drive system becomes excessively great, and this has led to the possibility that the problems of damping, noise, etc, arise.

SUMMARY OF THE INVENTION

It is an object of the present invention to provide an image recording apparatus in which the drive torque of drive means for effecting, for example, movement of a recording head or conveyance of a recording medium can be made variable.

It is another object of the present invention to provide an image recording apparatus in which the drive torque of drive means for effecting, for example, movement of a recording head or conveyance of a recording medium can be designated.

It is still another object of the present invention to provide an image recording apparatus which can obtain clear-cut recorded images.

It is yet still another object of the present invention to provide an image recording apparatus which is free of damping, noise or the like.

It is a further object of the present invention to provide an image recording apparatus in which the drive torque can be changed in conformity with thermal transfer recording in which ink is transferred from an ink sheet to a recording medium to thereby effect image recording on the recording medium and thermosensitive recording in which thermosensitive paper is caused to form a color to thereby accomplish image recording.

DESCRIPTION OF THE PREFERRED EMBODIMENTS

To achieve the above objects, the recording apparatus according to an embodiment of the present invention which will be described below comprises the following construction. The image recording apparatus for effecting image recording on a recording medium by a recording head in response to an input signal is provided with drive means for transfer-driving said recording head or said recording medium, designating means for designating the driving torque of said drive means, and means for controlling the driving current of said drive means so as to correspond to said driving torque.

In the above-described construction, when the drive torque of the drive means which effects the transfer-driving of said recording head or said recording medium is designated, the driving current of said drive means is controlled to correspond to the designated drive torque, that is, so as to be great when the torque is high and to be small when the torque is low.

Some preferred embodiments of the present invention will herein after be described in detail with reference to the drawings.

[Description of a Thermal Printer (FIG. 2)]

Figure 1:
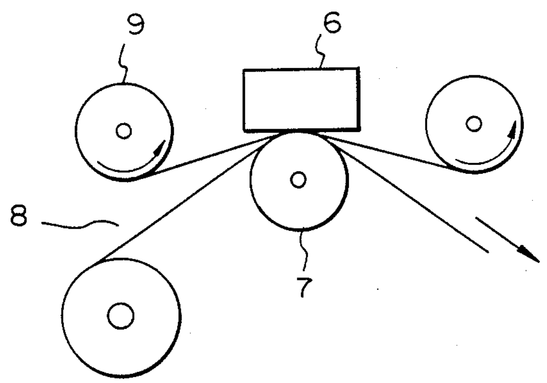
Fig. 1 PRIOR ART
FIG. 1 shows the construction of the recording portion of an example of the prior art.
Figure 2:
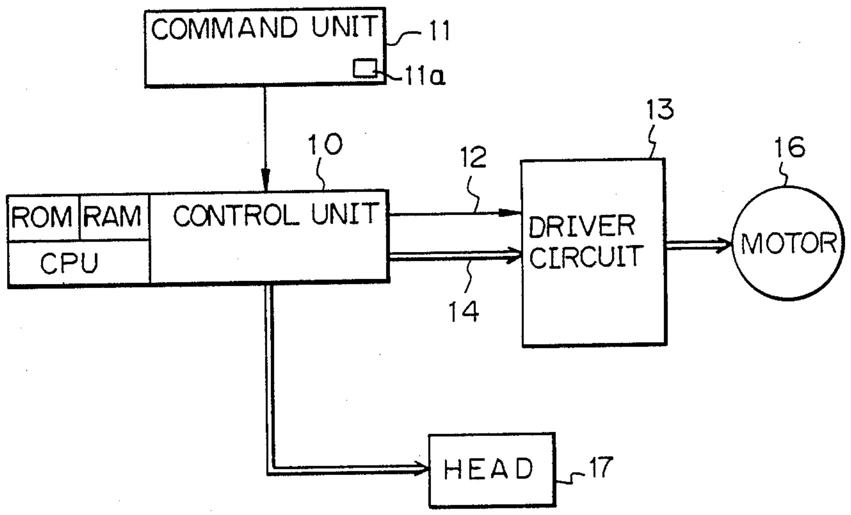
FIG. 2 schematically shows the construction of the essential portions of a thermal printer according to an embodiment to which the present invention is applied.

FIG. 2 schematically shows the construction of a thermal printer in an embodiment.

Figure 4:
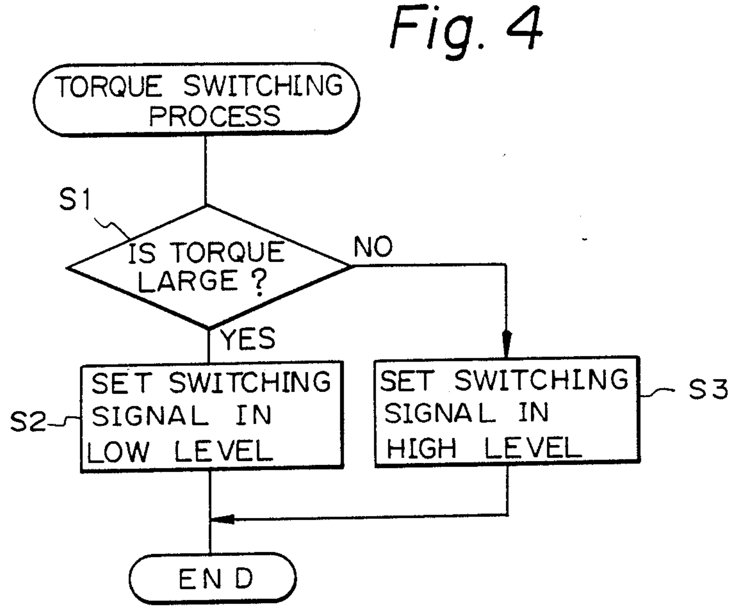
FIG. 4 is a flow chart of the torque switching process.

In FIG. 2, the reference numeral 10 designates a control unit for controlling the thermal printer. The control unit 10 is provided with a CPU such as a microprocessor, an ROM storing therein the control program, data, etc. of the CPU of which a part is shown in FIG. 4, an RAM used as the work area of the CPU, etc.

The reference numeral 11 denotes a command unit such as a switch 11*a* for instructing a drive system to switch its torque to correspond to the kind of recording paper used (for example, thermosensitive paper or plain paper). The switch 11*a* may be manually operated by the operator to thereby instruct the drive system to switch its torque. The command unit 11 is not restricted thereto, but the switching of the torque may be automatically indicated by a detection signal or the like indicative of the presence of an ink sheet which is produced, for example, by a sensor or the like.

Figure 3:
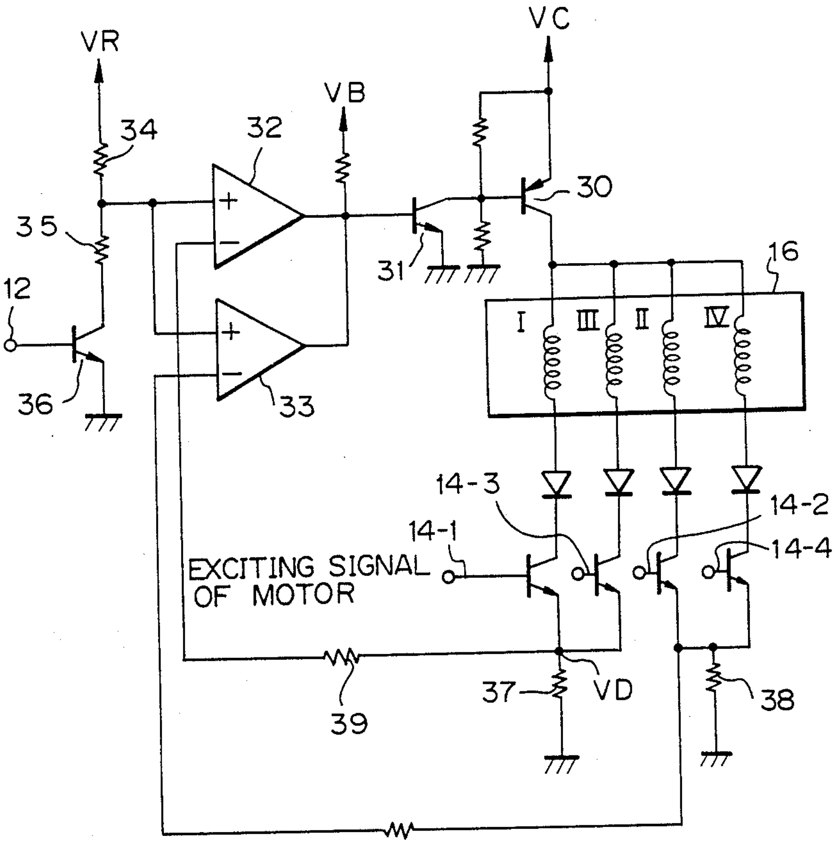
FIG. 3 shows the connection between a driver circuit and a motor in the embodiment to which the present invention is applied.

The reference numeral 13 designates a driver circuit for a motor the details of which are shown in FIG. 3, and the reference numeral 16 denotes a four-phase stepping motor or the like as a drive source for paper feeding or transferring a carriage carrying a thermal head 17 thereon. The driver circuit 13 receives as inputs from the control unit 10 a switching signal 12 for switching the torque and a four-phase exciting signal 14, and rotatively drives the motor 16 by a designated torque. A drive system for effecting the conveyance of an ink sheet and the conveyance of recording paper by the motor 16 will be specifically described later with reference to FIGS. 6 and 7.

[Description of the Driver Circuit (FIG. 3)]

FIG. 3 shows a specific example of the connection between the driver circuit 13 and the motor 16, and shows here the case of a four-phase stepping motor.

In FIG. 3, the reference numeral 30 designates a PNP transistor for supplying electric power to the motor 16. When an NPN transistor 31 is in its conductive state, that is, when the outputs of operational amplifiers 32 and 33 are both at a high level, the PNP transistor 30 is rendered conductive and supplies a current to the motor 16. A voltage divided by resistors 34 and 35 and an NPN transistor 36 is input to the non-inverting inputs of the operational amplifiers 32 and 33. This voltage assumes a voltage value obtained by dividing a voltage VR by the resistors 34 and 35 when the switching signal 12 is at a high level, and assumes a voltage value VR when the switching signal is at a low level.

The reference numerals 14–1 to 14–4 denote exciting signals from the control unit 10 which correspond to the phases (phases I-IV) of the motor 16. When for example, the exciting signal 14–1 assumes a high level, the corresponding NPN transistor is rendered conductive to permit a current to flow to the phase I of the motor 16. Thereafter, likewise, the stepping motor 16 can be rotatively driven by 1-2-phase excitation or 2-phase excitation. A resistor 37 is a current limiting resistor for detecting a current flowing to the phases I and III of the motor 16, and a resistor 38 is a current limiting resistor for detecting a current flowing to the phases II and IV of the motor 16.

By the wiring as shown in FIG. 3, only a current corresponding to maximum one phase flows to the resistors 37 and 38 even if the motor 16 is driven by any of 1-2-phase excitation or 2-phase excitation, and thus, the maximum voltage values of the inverting inputs of the operational amplifiers 32 and 33 are ensured.

When the phase I of the motor 16 is excited and a current flows to the coil thereof, that current flows through the resistor 27 and a voltage VD rises. This voltage VD is input to the inverting input of the operational amplifier 32 through a feedback resistor 39. If at this time, the switching signal 12 is indicated at a low level, i.e., a high torque, the voltage VD does not exceed the voltage value VR of the non-inverting input of the operational amplifier 32 and therefore, the motor 16 is driven by a maximum torque during the period of its excitation.

Description will now be made of a case where the switching signal 12 is at a high level, that is, a low torque is designated.

In the same manner as in the previously described case, the phase I of the motor 16 is excited and a current flows to the coil of phase I, whereupon the voltage VD of the resistor 37 rises. When this voltage VD becomes approximate to the voltage value of the non-inverting input of the operational amplifier 32 (the voltage value obtained by dividing the voltage VR by the resistors 35 and 36), the output voltage level of the operational amplifier 32 becomes low and the collector current of the transistor 31 decreases and the collector current of the PNP transistor 30 also decreases.

Accordingly, the driving current of the motor 16 is reduced and therefore the torque of the motor is reduced. This also holds true of the other phases of the motor 16.

[Torque Conversion by the Control Unit (FIG. 4)]

FIG. 4 is a flow chart of the torque switching process by the control unit 10.

First, at step S1, the torque setting command input of the motor 16 from the command unit 11 is checked. In the embodiment shown, for example, the torque is large in the case of thermal transfer recording on plain paper, and the torque is small in the case of thermosensitive recording on thermosensitive paper.

When the torque of the motor 16 is designated to be large, advance is made to step S2, where the switching signal 12 is set in low level. Thereby, the voltage values of the non-inverting inputs of the operational amplifiers 32 and 33 become VR.

On the other hand, when the torque set is small, advance is made to step S3, where the switching signal 12 is set in high level, and the transistor 36 in the driver circuit 13 of FIG. 3 is rendered conductive. Thereby, the voltage values of the non-inverting inputs of the operational amplifiers become the value obtained by dividing VR by the resistors 34 and 35, as previously mentioned.

When the motor 16 has been driven by the above-described torque setting, control of that torque is effected as previously described.

[(Description of a Drive Transmission Mechanism (FIGS. 5 and 6)]

Figure 5:
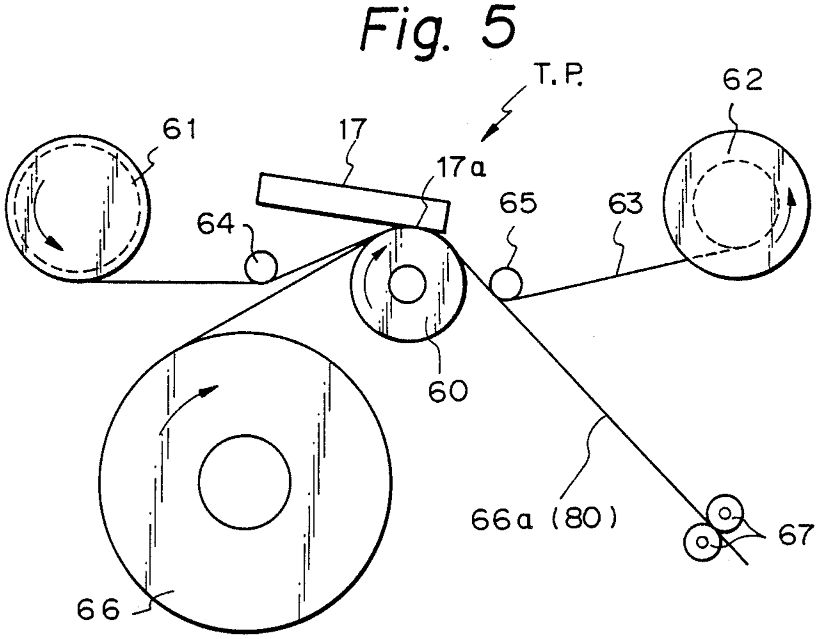
FIG. 5 is a schematic view of a thermal printer to which the present invention is applied.
Figure 6:
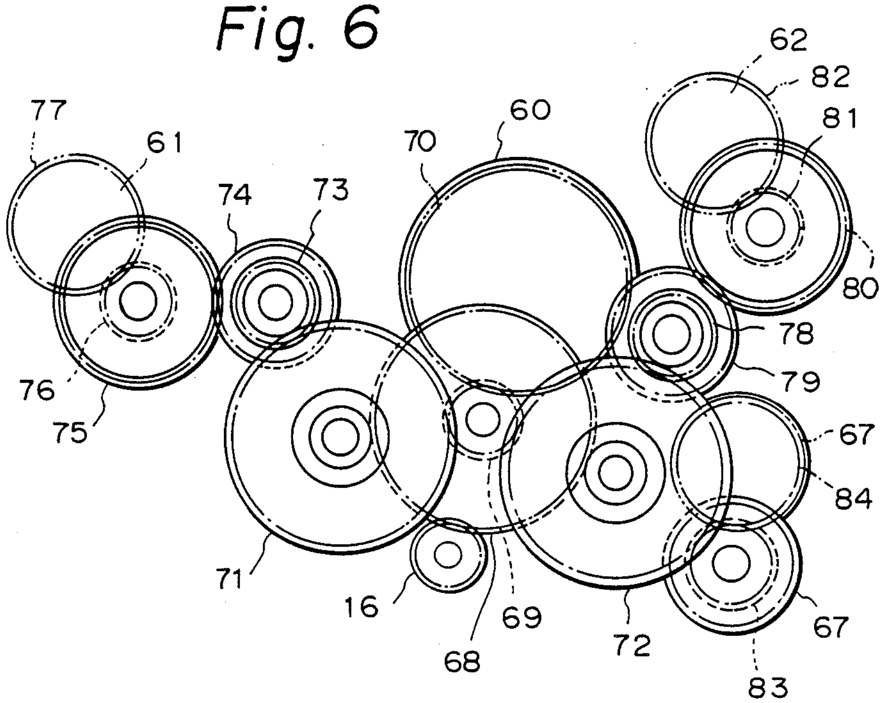
FIG. 6 is a side view showing the drive transmission mechanism of the thermal printer shown in FIG. 5.

Reference is now had to FIGS. 5 and 6 to specifically describe the drive transmission mechanism of a thermal printer provided with the motor 16 controlled as described above.

FIG. 5 is a schematic illustration of the thermal printer T.P.

This thermal printer T.P. permits an ink sheet 63 having ink applied thereto and a plain paper recording sheet 66*a* to be removably mounted thereon, and is of a combined use type which can accomplish thermal transfer recording by the ink sheet 63 and the plain paper recording sheet 66*a* being mounted thereon and which can accomplish thermosensitive recording by removing the ink sheet 63 therefrom and interchanging the plain paper recording sheet 66*a* with a thermosensitive paper sheet 80 and mounting the latter thereon.

In FIG. 5, the reference numeral 61 designates an ink sheet supply roll removably mountable on the printer T.P. The ink sheet 63 supplied from this supply roll 61 passes between a thermal head 17 and a platen roller 60 via a guide roller 64 and is taken onto an ink sheet take-up roll 62 via a separating shaft 65. The reference numeral 66 denotes a recording paper roll removably mountable on the printer T.P. As the plain paper recording sheet 66*a* supplied from the recording paper roll 66 passes between the thermal head 17 (having a plurality of heat generating elements 17*a*) and the platen roller 60, image recording is effected thereon, and the plain paper recording sheet 66*a* is discharged out of the apparatus by a pair of discharge rollers 67. In the case of thermal transfer recording, the recording paper roll 66 with the plain paper 66*a* wound thereon is mounted on the printer, and in the case of thermosensitive recording, the recording paper roll 66 with thermosensitive paper 80 wound thereon is mounted on the printer.

Now, the drive transmission system of this thermal printer T.P. will be described with reference to FIG. 6.

First, the rotative drive force of the motor 16 is transmitted to a gear 68. It is then transmitted through a gear 69 integral with the gear 68 to a gear 70, a gear 71 and a gear 72. The rotative drive force transmitted to the gear 70 rotates the platen 60 provided integrally with the gear 70. The rotative drive force transmitted to the gear 71 is transmitted through gears 73, 74, 75 and 76 to a gear 77 and rotates the ink sheet supply roll 61 provided integrally with the gear 77. The rotative drive force transmitted to the gear 72 is transmitted through gears 78, 79, 80 and 81 to a gear 82 and rotates the ink sheet take-up roll 62 provided integrally with the gear 82. Further, the rotative drive force transmitted to the gear 72 is transmitted to gears 83 and 84 and rotates the discharge rollers 67.

Thus, the motor 16 in the present embodiment effects the supply and take-up driving of the ink sheet, the driving of the platen roller 60 (the conveyance of the recording paper) and the driving of the discharge rollers 67. When the ink sheet supply roll 61 is not mounted, the drive transmission gear for conveying the ink sheet rotates idly.

[Description of Another Embodiment (FIG. 7)]

Figure 7:
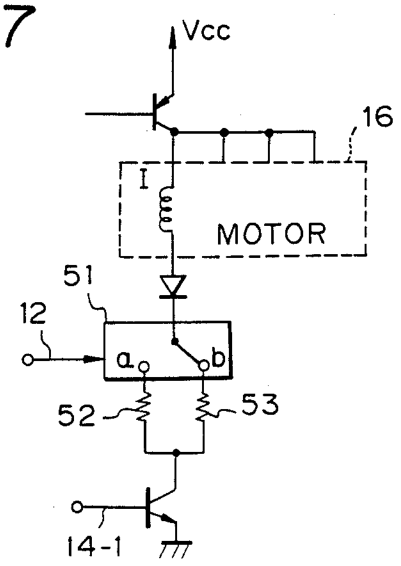
FIG. 7 is a schematic circuit diagram of a driver circuit according to another embodiment to which the present invention is applied.

FIG. 7 illustrates a motor driver circuit according to another embodiment of the present invention. In FIG. 7, portions common to those in FIG. 3 are given identical reference numerals and need not be described. In FIG. 7, only the phase I of the motor is shown exemplarily.

The reference numeral 51 designates an analog switch capable of being changed over to any of contacts a and b by the switching signal 12 from the control unit 10. Assuming that a resistor 53 is lower in resistance than a resistor 52, when the switch 51 is connected to the contact b as shown, the drive current of the motor becomes great and therefore a high torque is provided, and when the switch 51 is connected to the contact a, the drive current decreases and therefore the motor 16 is driven by a low torque.

As described above, according to the present embodiment, the same drive system is used for thermosensitive recording and thermal transfer recording and is switched to drive torques suitable for the respective systems, whereby recording can be accomplished at an optimum torque for each system.

Thus, a recording apparatus both for thermosensitive recording and thermal transfer recording is realized compactly and inexpensively, and its noise and quality of recorded image are remarkably improved.

While the present embodiment has been described with respect to the cases of the print onto thermosensitive paper in a thermosensitive recording apparatus and the thermal transfer print, the present invention is not restricted thereto, but the present invention can also be used so as to provide a high torque, for example, in the case of multiprint (print using pressure-sensitive copying paper) in a wire dot printer or the like. Also, to obtain a drive force from the same motor, the conveyance of the ink sheet, the conveyance of the recording medium or the movement of the recording means such as the thermal head may be suitably selected. Also, controlling the electric power supplied to the drive means is controlling the current, the voltage or the pulse width.

As has been described above, according to the present invention, the torque of the drive system can be easily changed and therefore, damping, noise, etc. can be decreased.

I claim:

1. An image recording apparatus for effecting image recording on a recording medium, having:

recording means for effecting image recording conforming to image information on the recording medium;

an ink sheet mounting portion for removably mounting thereon an ink sheet having ink;

a recording medium mounting portion for removably mounting the recording medium thereon;

ink sheet conveying means for conveying the ink sheet mounted on said ink sheet mounting portion;

recording medium conveying means for conveying the recording medium mounted on said recording medium mounting portion;

a drive source for providing a drive force;

drive force transmitting means for transmitting the drive force of said drive source to said recording medium conveying means;

drive force transmitting means for transmitting the drive force of said drive source to said ink sheet conveying means;

designating means for designating the drive torque of said drive source; and control means for controlling electric power applied to said drive source in conformity with the drive torque designated by said designating means.

2. An image recording apparatus according to claim 1, wherein said recording medium is thermosensitive paper.

3. An image recording apparatus according to claim 1, wherein said recording medium is plain paper.

4. An image recording apparatus according to claim 1, wherein said electric power is a current.

5. An image recording apparatus according to claim 1, wherein said drive source is a stepping motor.

6. An image recording apparatus according to claim 1, wherein said designating means has a switch manually operable to designate the drive torque of said drive source.

7. An image recording apparatus according to claim 1, wherein rotation of a platen roller for conveying said recording medium and rotation of an ink sheet take-up roller for taking up said ink sheet are accomplished by the drive force of said drive source.

8. An image recording apparatus according to claim 1, wherein the drive force of said drive source further accomplishes rotation of discharge rollers for discharging said recording medium.

9. An image recording apparatus according to claim 1, further including a sensor for indicating the presence or absence of an ink sheet to be conveyed and means responsive to a signal from said sensor for controlling the magnitude of said drive force to correspond to the presence or absence of an ink sheet.

10. An image recording apparatus for effecting image recording on a recording medium by a recording head in response to an input signal, characterized by the provision of:

drive means for effecting the transfer-driving of said recording head or said recording medium;

designating means for designating the drive torque of said drive means; and means for controlling the driving current of said drive means in conformity with said drive torque.

11. An image recording apparatus a to claim 10, wherein said drive means comprises a motor of eat least two phases and the driving current of each phase of said motor is divided into two stages, i.e., a high torque and an low torque, and in the latter case, the driving current value is made small as compared with the former case.

* * * * *

UNITED STATES PATENT AND TRADEMARK OFFICE
CERTIFICATE OF CORRECTION

PATENT NO. : 4,896,167

DATED : January 23, 1990

INVENTOR(S) : NAOJI HAYAKAWA

It is certified that error appears in the above-identified patent and that said Letters Patent is hereby corrected as shown below:

COLUMN 8, line 9, "a" should read --according--;

line 10, "eat" should read --at--.

Signed and Sealed this

Twentieth Day of November, 1990

*Attest:*

HARRY F. MANBECK, JR.

*Attesting Officer*

*Commissioner of Patents and Trademarks*